(12) United States Patent
Lang et al.

(10) Patent No.: US 8,578,292 B2
(45) Date of Patent: Nov. 5, 2013

(54) SIMULTANEOUS DOCUMENT ZOOM AND CENTERING ADJUSTMENT

(75) Inventors: Brent M. Lang, Seattle, WA (US); Han-Yi Shaw, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 685 days.

(21) Appl. No.: 11/687,554

(22) Filed: Mar. 16, 2007

(65) Prior Publication Data

US 2008/0148177 A1 Jun. 19, 2008

Related U.S. Application Data

(60) Provisional application No. 60/870,031, filed on Dec. 14, 2006.

(51) Int. Cl.
 *G06F 3/048* (2013.01)

(52) U.S. Cl.
 USPC .......................... 715/788; 715/784; 715/785

(58) Field of Classification Search
 USPC .................... 715/784, 788, 785, 781
 See application file for complete search history.

(56) References Cited

U.S. PATENT DOCUMENTS

| | | | | |
|---|---|---|---|---|
| 6,259,432 B1 * | 7/2001 | Yamada et al. | 345/159 |
| 7,116,340 B2 * | 10/2006 | Van Liere | 345/619 |
| 7,415,676 B2 * | 8/2008 | Fujita | 715/781 |
| 7,486,274 B2 * | 2/2009 | Forlines et al. | 345/157 |
| 7,506,275 B2 * | 3/2009 | Conradt et al. | 715/857 |
| 7,640,515 B2 * | 12/2009 | Balakrishnan et al. | 715/848 |
| 7,707,516 B2 * | 4/2010 | O'Mullan et al. | 715/834 |
| 7,814,439 B2 * | 10/2010 | Fitzmaurice et al. | 715/856 |
| 2003/0174174 A1 * | 9/2003 | Fitzpatrick et al. | 345/809 |
| 2004/0001041 A1 * | 1/2004 | Chang et al. | 345/156 |
| 2004/0021694 A1 * | 2/2004 | Doar | 345/784 |
| 2004/0046796 A1 * | 3/2004 | Fujita | 345/767 |
| 2005/0168488 A1 * | 8/2005 | Montague | 345/659 |
| 2005/0206657 A1 * | 9/2005 | Arcas | 345/660 |
| 2005/0270311 A1 * | 12/2005 | Rasmussen et al. | 345/677 |
| 2006/0082901 A1 * | 4/2006 | Shoemaker | 359/692 |
| 2006/0132440 A1 * | 6/2006 | Safai | 345/163 |
| 2006/0242605 A1 * | 10/2006 | Kim et al. | 715/855 |
| 2007/0040800 A1 * | 2/2007 | Forlines et al. | 345/158 |
| 2007/0083823 A1 * | 4/2007 | Jaeger | 715/787 |
| 2007/0096945 A1 * | 5/2007 | Rasmussen et al. | 340/995.1 |
| 2007/0200821 A1 * | 8/2007 | Conradt et al. | 345/156 |
| 2007/0273712 A1 * | 11/2007 | O'Mullan et al. | 345/650 |
| 2008/0158191 A1 * | 7/2008 | Yang et al. | 345/173 |

* cited by examiner

*Primary Examiner* — Daeho Song
(74) *Attorney, Agent, or Firm* — Vierra Magen Marcus LLP

(57) ABSTRACT

A user may control automatic zooming and scrolling functionality with respect to a selected point in the document. A user may provide a first input to select an anchor point in the document. A user may then provide a second input to indicate a zooming level. In response to the second input, the document may zoom in or out of the document (depending on the input) and simultaneously perform scrolling to adjust the displayed center of the document towards the anchor point. The scrolling and zooming functions are performed automatically in response to the second input. In some embodiments, a custom zoom cursor may be displayed during a zoom state and change to indicate the zooming function performed. In some embodiments, the input device may be a pointing device such as a mouse, or another type of input device such as a keyboard, touch screen or other device.

19 Claims, 7 Drawing Sheets

SIMULTANEOUS DOCUMENT ZOOM AND CENTERING ADJUSTMENT

CLAIM OF PRIORITY

This application claims the benefit of commonly assigned U.S. provisional patent application No. 60/870,031, filed Dec. 14, 2006, titled "Automatic Document Zoom and Centering Adjustment".

BACKGROUND

Word processing and desktop publishing applications are common computer applications used by people in business, education and at home. Typical word processing and desktop publishing applications allow a user to view and edit a document. As part of editing a document, a user may zoom in or out of the document. Upon providing input to zoom to a traditional document, the application magnifies the document while maintaining a current displayed center of the document. This makes it difficult to zoom in on different portions of the document that are not currently displayed in the center. For example, to zoom in on an upper left hand corner portion of a document being displayed, a user would have to provide a first input to zoom into the document to the desired zoom level and then provide a second input through a different means to scroll to the document position in the document to view the area of interest. Additionally, to dynamically zoom in and zoom out typically requires a user to switch out from one zoom mode into another through multiple inputs, as opposed to a single input.

In some applications, a user may provide input from two or more input devices to zoom in on a point in a document and scroll to the point simultaneously. For example, in some word processing programs, a user may select a point in the document by clicking on the point using a mouse device. After the point is selected, a user may hold the 'control' key and user a scroll wheel on a mouse device to zoom into the document. As the scroll wheel is manipulated, a user may zoom in and out of the document. Initially, the zoom operation zooms into the center of the document. If the selected point approaches the bottom or top edge of the displayed portion of the document, the document may scroll up or down to keep the selected point in view. Thus, while the document is zooming in, the center of the displayed document may be adjusted automatically to keep the selected point on the top or the bottom edge of the screen, depending on which edge the selected point approaches.

It is desirable to improve document viewing capabilities of word processing applications.

SUMMARY

The technology described herein pertains to an efficient zooming function in a document application. In some embodiments, the zooming function may be in the publishing-layout view of a documents application. A user may efficiently perform a zoom or magnification operation and a scrolling operation simultaneously with respect to a selected point in the document. In some embodiments, the scrolling may be the result of performing a mouse drag operation. A first input may select an anchor point in the document. A second input may then be received, for example by dragging a cursor across the document using a pointer device. In response to receiving the second input, a zoom in or zoom out function and scrolling are performed on the document (depending on the input) simultaneously to adjust the document magnification and move the displayed center of the document towards the anchor point. The scrolling and zooming functions are performed automatically in response to the second input.

In some embodiments, a custom zoom cursor may be displayed in response to entering a zoom state in the document application, for example a publishing-layout application. The custom zoom cursor may indicate that the application is in a zoom state, the current or most recent direction that the zoom cursor has been moved and a zoom function (for example, a zoom in or zoom out with respect to a default zoom level) performed on the document.

In some embodiments, a view of a document may be adjusted by receiving a first input into the document from an input device. A location for an anchor point within the document is determined within the document in response to receiving the first input. A second input may then be received from the input device. The displayed center of the document and a zoom level of the document are simultaneously adjusted in response to receiving the second input. In some embodiments, the display of a cursor is changed in response to the second input as well. In some embodiments, the input device may be a pointing device such as a mouse, or another type of input device such as a keyboard, touch screen or other device.

In one embodiment, a method for displaying a document begins with receiving input from an input device by a document application. A location for an anchor point is then determined within the document in response to the first input. A second input is then received from the input device and the displayed center of the document is automatically adjusted in response to the second input. The center is adjusted with respect to the anchor point. The zoom level of the document is also automatically adjusted in response to the second input.

One embodiment includes one or more processor readable storage devices that receive a first input into a document. A first set of coordinates is then selected in a document based on said first input. A second input is then received in the document. A scrolling operation and a zoom operation are automatically performed with respect to the first set of coordinates based on the second input.

In some embodiments, a first input is received to move a cursor within a document provided by a document application. A magnification level and displayed center of the document are then automatically adjusted with respect to the first input. The appearance of the cursor is adjusted based on the first input to move the cursor.

This summary is provided to introduce a selection of concepts in a simplified form that are further described below in the description. This summary is not intended to identify key features or essential features of the claimed subject matter, nor is it intended to be used as an aid in determining the scope of the claimed subject matter.

DETAILED DESCRIPTION

An efficient zooming function is provided in the publishing-layout view of a document application, such as a publishing-layout view of a document application. The document application receives user input to simultaneously perform zoom and scroll operations on a portion of a document being viewed through the document application. The zoom and scrolling (or mouse-drag) operations are performed with respect to a selected point in the document. Indicators may indicate the zooming function performed on the document, the trend of the current zoom, and other data. In some embodiments, the indicators may be visual and implemented as part of a cursor or some other portion of the document application.

The document application may enter a zoom state in response to user input. After entering the zoom state, a user may provide a first input to select an anchor point in the document. A user may then provide a second input to indicate a zooming level. In response to the second input, the document may zoom in or out of the document based on the input and simultaneously perform scrolling to adjust the displayed center of the document towards the anchor point. The scrolling and zooming functions are performed automatically in response to the second input.

In some embodiments, a custom zoom cursor may be displayed in response to entering a zoom state in the document application. The custom zoom cursor may indicate that the application is in a zoom state by having a different appearance from the default cursor. The current or most recent direction that the zoom cursor has been moved may be indicated by a directional icon which comprises part of the cursor. The appearance of the cursor may also indicate whether a zoom in or zoom out function is performed on the document. In some embodiments, the zoom state, cursor direction and zoom function and/or other zoom or scrolling information may be indicated elsewhere the document application, such as in a toolbar menu.

In one embodiment, the present technology can be implemented with a single button and a "cursor drag" input mechanism on a pointer device, such as a mouse. Thus, typical assistive mechanisms such as scrolling wheels, second or third pointer device buttons (such as mouse buttons), and other input mechanisms in addition to the two buttons and cursor dragging input mechanism of a traditional pointer device are not needed to utilize the present technology. Portions of the description refer to a pointing device in describing example embodiments of the present technology. References to a particular type of input device are made for purposes of discussion only. It is intended that other types on input devices could be used to implement the present technology.

Figure 1:
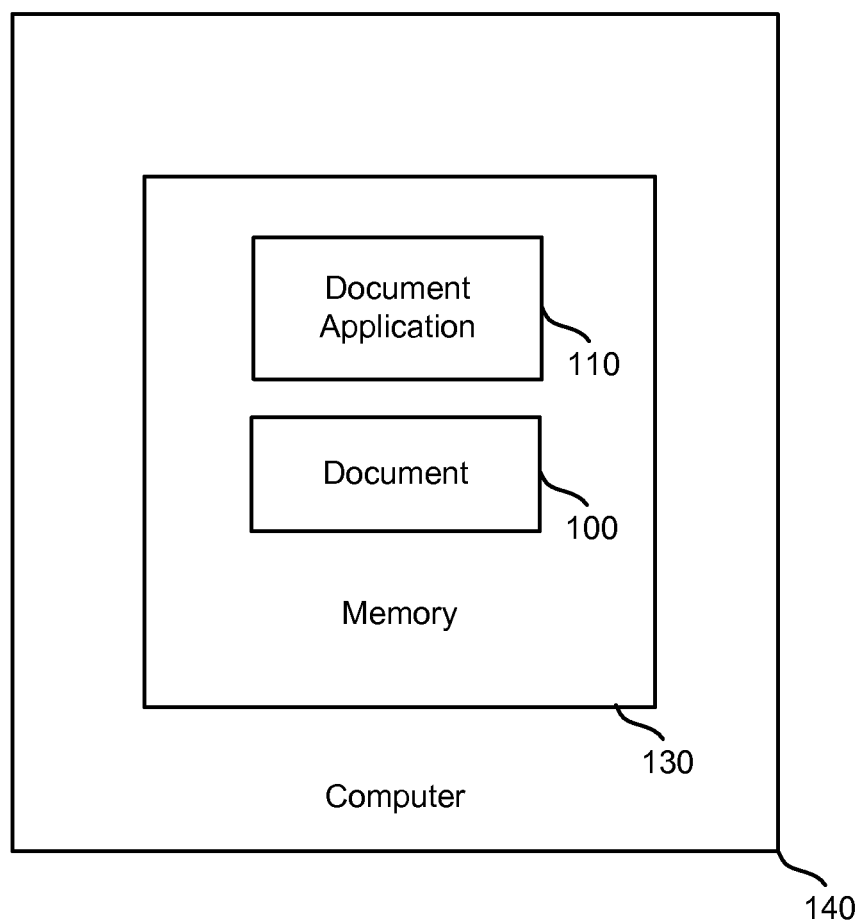
FIG. 1 illustrates a block diagram of an embodiment of a document and document application residing on a computer.

FIG. 1 illustrates a block diagram of an embodiment of a computer storing a document. FIG. 1 includes computer 140 which includes memory 130. Memory 130 may be implemented as memory 230 discussed in more detail below. Document 100 and document application 110 are stored in memory 130 of computer 140. Document application 110 may load, display, edit and/or perform other functions to document 100. In one embodiment, document application 110 may be used to load document 100 and perform simultaneous zoom and scroll functions on document 100. In some embodiments, document application 110 may be a word processing application, an application for processing and viewing graphical images such as slides, or some other type of application for viewing documents or data. An example of a suitable word processing application for implementing document application 110 may include "Microsoft Word 2008 for Mac", by Microsoft Corporation, of Redmond, Wash.

In some embodiments, the present technology may be used with word publishing applications, such as "Microsoft Office Power Point," by Microsoft Corporation. One feature of the present technology when used with a publishing application allows for automatic scrolling and zooming functionality based on an automatically selected anchor point. For example, an anchor point may be automatically selected based on the position of a cursor in the published document when zoom input is received by the publishing application which provides the document. This is advantageous over most prior publishing applications, which require a separate input for selecting an anchor point in the space of a publishing document provided by a publishing application.

Figure 2:
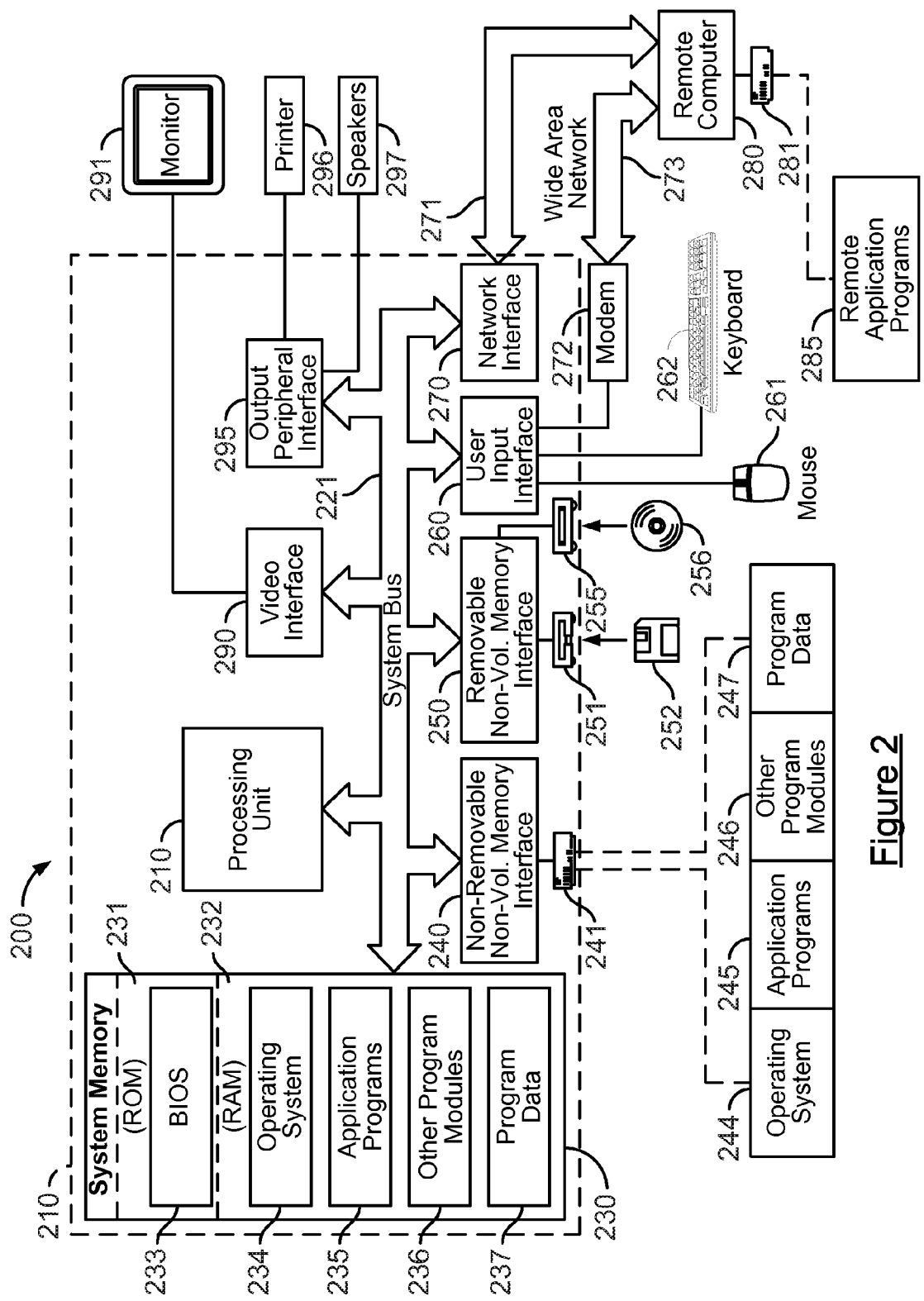
FIG. 2 is an embodiment of a computing system for use with the present technology.

FIG. 2 illustrates an example of a suitable computing system environment 200 on which the present technology may be implemented. In some embodiments, the computing environment of FIG. 2 may be used to implement computer 140 of FIG. 1. Computing system environment 200 is only one example of a suitable computing environment and is not intended to suggest any limitation as to the scope of use or functionality of the technology. Neither should the computing environment 200 be interpreted as having any dependency or requirement relating to any one or combination of components illustrated in the exemplary operating environment 200.

The technology is operational with numerous other general purpose or special purpose computing system environments or configurations. Examples of well known computing systems, environments, and/or configurations that may be suitable for use with the technology include, but are not limited to, personal computers, server computers, hand-held or laptop devices, cell phones, smart phones, multiprocessor systems, microprocessor-based systems, set top boxes, programmable consumer electronics, network PCs, minicomputers, mainframe computers, distributed computing environments that include any of the above systems or devices, and the like.

The technology may be described in the general context of computer-executable instructions, such as program modules, being executed by a computer. Generally, program modules include routines, programs, objects, components, data structures, etc. that perform particular tasks or implement particular abstract data types. The technology may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system for implementing the technology includes a general purpose computing device in the form of a computer 210. Components of computer 210 may include, but are not limited to, a processing unit 220, a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 210 typically includes a variety of computer readable media. Computer readable media can be any available media that can be accessed by computer 210 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 210. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 230 includes computer storage media in the form of volatile and/or nonvolatile memory such as read only memory (ROM) 231 and random access memory (RAM) 232. A basic input/output system 233 (BIOS), containing the basic routines that help to transfer information between elements within computer 210, such as during start-up, is typically stored in ROM 231. RAM 232 typically contains data and/or program modules that are immediately accessible to and/or presently being operated on by processing unit 220. By way of example, and not limitation, FIG. 2 illustrates operating system 234, application programs 235, other program modules 236, and program data 237.

The computer 210 may also include other removable/non-removable, volatile/nonvolatile computer storage media. By way of example only, FIG. 2 illustrates a hard disk drive 240 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240, and magnetic disk drive 251 and optical disk drive 255 are typically connected to the system bus 221 by a removable memory interface, such as interface 250.

The drives and their associated computer storage media discussed above and illustrated in FIG. 2, provide storage of computer readable instructions, data structures, program modules and other data for the computer 210. In FIG. 2, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 20 through input devices such as a keyboard 262 and pointing device 261, commonly referred to as a mouse, trackball or touch pad. Other input devices (not shown) may include a microphone, joystick, game pad, satellite dish, scanner, or the like. These and other input devices are often connected to the processing unit 220 through a user input interface 260 that is coupled to the system bus, but may be connected by other interface and bus structures, such as a parallel port, game port or a universal serial bus (USB). A monitor 291 or other type of display device is also connected to the system bus 221 via an interface, such as a video interface 290. In addition to the monitor, computers may also include other peripheral output devices such as speakers 297 and printer 296, which may be connected through an output peripheral interface 290.

The computer 210 may operate in a networked environment using logical connections to one or more remote computers, such as a remote computer 280. The remote computer 280 may be a personal computer, a server, a router, a network PC, a peer device or other common network node, and typically includes many or all of the elements described above relative to the computer 210, although only a memory storage device 281 has been illustrated in FIG. 2. The logical connections depicted in FIG. 2 include a local area network (LAN) 271 and a wide area network (WAN) 273, but may also include other networks. Such networking environments are commonplace in offices, enterprise-wide computer networks, intranets and the Internet.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the user input interface 260, or other appropriate mechanism. In a networked environment, program modules depicted relative to the computer 210, or portions thereof, may be stored in the remote memory storage device. By way of example, and not limitation, FIG. 2 illustrates remote application programs 285 as residing on memory device 281. It will be appreciated that the network connections shown are exemplary and other means of establishing a communications link between the computers may be used.

Figure 3A:
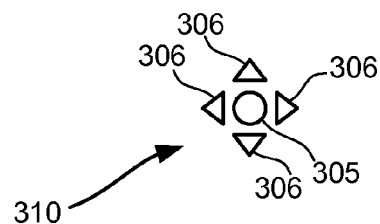
FIG. 3A is an example of a custom zoom cursor.

FIG. 3A illustrates an example of a customized zoom cursor 310. Zoom cursor 310 can be displayed once a user has entered a zoom state. This is discussed in more detail below with respect to FIG. 4. Zoom cursor 310 includes center portion 305 and four outer portions 306 positioned along the outside of center portion 305. In the embodiment illustrated in FIG. 3A, outer portions 306 are displayed as four small triangular shapes to the top, bottom, left and right side of center portion 305. Center portion 305 is displayed as a circle. In some embodiments, any combination of shapes can be used to implement a zoom cursor.

While in the zoom state, document application 110 may receive input to move the zoom cursor within the document.

As the zoom cursor moves, the display of the zoom cursor may change to center portion 305 and a single outer portion which indicates the direction of the cursor is moving. For example, if the cursor is moved from left to right within the document, the zoom cursor may be displayed as center portion 305 and the rightmost outer portion of FIG. 3A. An example of the cursor displayed when moved from left to right within a document is contained in zoom region 331 and 332 of FIG. 3B and is discussed in more detail below. Zoom cursor 310 of FIG. 3A is only one example of several types of cursors that can be used with the current technology.

Figure 3B:
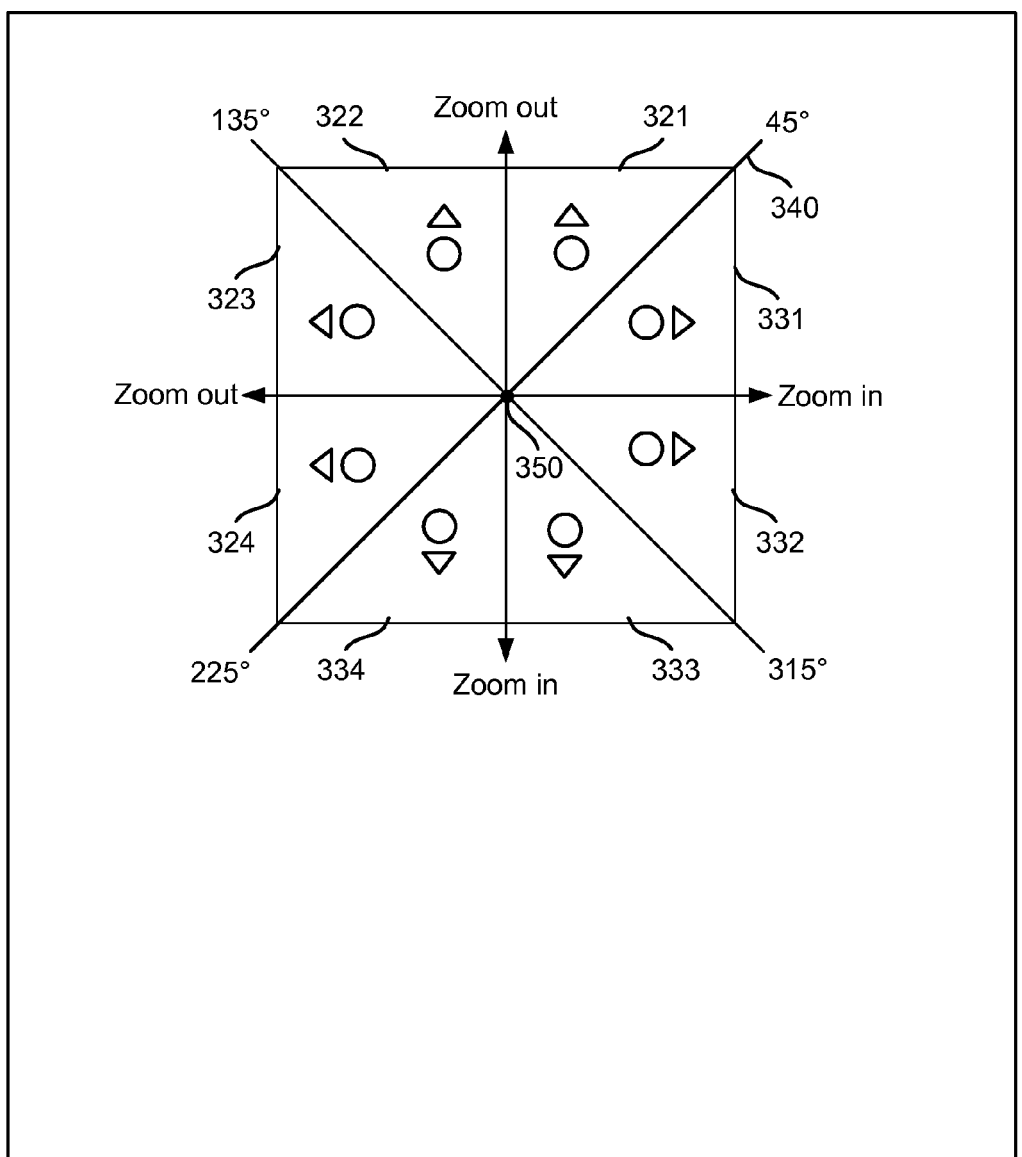
FIG. 3B is an example of a symbolic map of zoom functions with respect to an anchor point in a document.

FIG. 3B displays an example of a symbolic zoom map within a document 100 associated with document 100. Symbolic zoom map includes anchor point 350, default zoom line 340, zoom out regions 321-324 and zoom in regions 331-334. When a user selects a point in a document upon entering the zoom state, the selected point is designated as anchor point 350. As additional input is received which moves the zoom cursor to different portions of the document, the zoom cursor location is effectively moved to different portions of the zoom map. Zoom and scrolling operations are performed to the document in response to moving the cursor to different portions of the zoom map.

As a user moves a zoom cursor from anchor point 350 to a zoom region, the zoom level changes. For example, the further into a zoom region and away from anchor point 350 a cursor is positioned, the more the zoom level is adjusted. The scroll level is adjusted as well. Thus, the further the cursor is moved away from the anchor point, the more the document is scrolled towards the anchor point. This is discussed in more detail below with respect to FIGS. 3C-3E.

In some embodiments, the symbolic map is not actually generated. Rather, upon receiving a selection of an anchor point and input to move a cursor, document application 110 determines coordinates for default zoom line 340, the side of default zoom line the cursor is on, and the distance between the zoom cursor and anchor point 350. Scrolling and zooming are then performed based on the position of the zoom cursor with respect to zoom default line 340 and anchor point 350. In some embodiments, other ways of determining a zoom based on the location of the zoom cursor with respect to the anchor point and other data are possible.

The zoom cursor is moved over the document as a user provides input through a pointing device or some other input device. As the zoom cursor position changes within the document as part of a second input in zoom mode, the appearance of the zoom cursor changes. Representative examples of the appearance of a zoom cursor as it is moved away from anchor point 350 in each zoom region are illustrated in the symbolic zoom map of FIG. 3B. For example, if a cursor is positioned over anchor point 350 within document 100, the zoom cursor is displayed with a directional icon (such as a triangle) above the main portion, as illustrated in regions 321 and 322.

The center portion of a zoom cursor may change based on what magnification region the cursor is positioned in. In the embodiment illustrated in FIG. 3, when a zoom cursor is positioned above default zoom line 340, corresponding to zoom out or demagnification regions 321-324, a minus sign "−" is displayed in the center of the zoom cursor. The minus sign indicates that a zoom out function is being performed with respect to anchor point 350. Similarly, a plus sign "+" is illustrated in the center portion of the zoom cursor when the zoom cursor position below default zoom line 340 within a magnification region or zoom in region 331-334.

FIG. 3B is only one example of a symbolic zoom map and zoom cursor changes that can used with the present technology. Other maps and cursor designs may be used as well. Additionally, the map of FIG. 3B which displays the regions in terms of degrees is for illustrative purposes only. In some embodiments, the zoom function map can be used to determine a zoom function based on the coordinates of the cursor rather than a distance and angle of the cursor from anchor point 350.

Figure 3C:
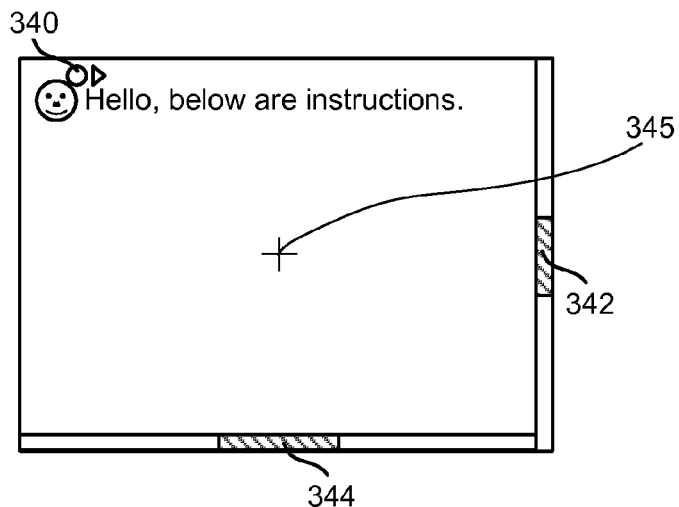
FIGS. 3C-3E illustrate examples of a document with different zoom and scrolling settings.
Figure 3D:
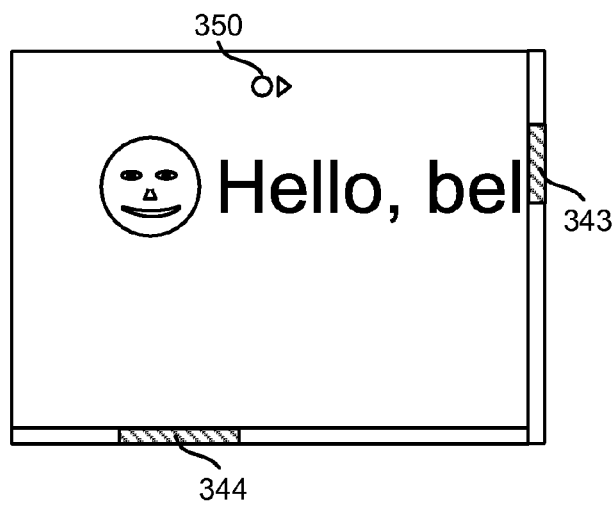
Figure 3E:
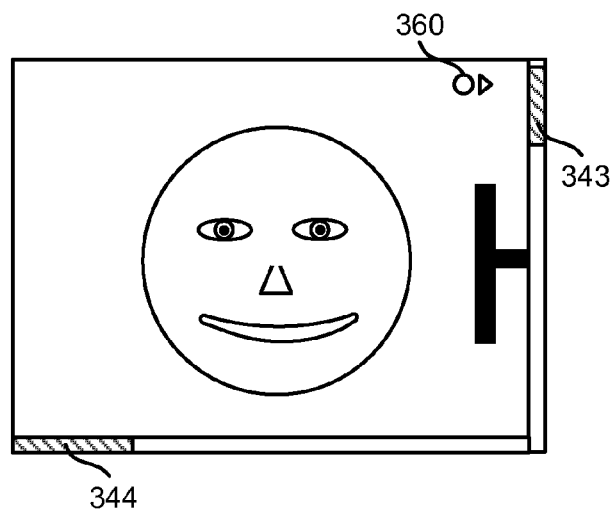

FIGS. 3C-3E illustrate examples of simultaneous document zooming and scrolling in response to pointing device input. FIG. 3C illustrates an example document at a default level of zoom and scroll. The document of FIG. 3C includes zoom cursor 340, vertical scroll bar 342, horizontal scroll bar 344 and displayed document center 345. The document of FIG. 3C also includes content comprising of a face icon and the text "Hello, below are instructions." The content is located at the top of the document. The zoom cursor is located near the face icon at the beginning of the text on the left side of the document. For purposes of discussion, it shall be assumed that the location of zoom cursor 340 in the document of FIG. 3C is the approximate location of the anchor point. Thus, a first input is received to select the zoom cursor location as the anchor point. However, the zooming and scrolling effects illustrated in FIGS. 3D and 3E may not be shown exactly to scale with respect to the location of the anchor point.

FIG. 3D illustrates the document of FIG. 3C after a second input is received in a zoom state. FIG. 3D includes zoom cursor 350, vertical scroll bar 343 and horizontal scroll bar 344. A second input is received as movement of the zoom cursor from the position of zoom cursor 340 at the left of the document in FIG. 3C to the position of zoom cursor 350 in the middle of the document of FIG. 3D, in a left to right direction. As a result of the second input, a zoom in function is performed. Accordingly, the face icon appears larger, revealing more detail, and the text appears larger. In particular, only the face icon and the text "Hello, bel" fits into the displayed portion of the document. Vertical scroll bar 343 has been moved upwards from its previous position in the document of FIG. 3C. Similarly, horizontal scroll bar 344 has been moved to the left from its previous position in the document of FIG. 3C. If the scroll bars were not adjusted in response to the input (as in previous systems), document center 345 would be zoomed in on and displayed in document 100 of FIG. 3D (not illustrated in FIG. 3D).

FIG. 3E illustrates the document of FIG. 3D after additional input is received in a zoom state. FIG. 3E includes zoom cursor 360, vertical scroll bar 343 and horizontal scroll bar 344. The additional input is received as movement of the zoom cursor from the position of zoom cursor 350 in the middle of the document of FIG. 3D to the position of zoom cursor 360 on the right side of the document of FIG. 3E, in a left to right direction. As a result of the input, a zoom in function is performed. Accordingly, the face icon appears larger than in the display of FIG. 3D, revealing even more detail, and the text appears larger. In particular, only the face icon and a portion of the first letter "H" of the text fit into the displayed portion of the document. Vertical scroll bar 343 has been moved upwards from its previous position in the document of FIG. 3D. Similarly, horizontal scroll bar 344 has been moved to the left from its previous position in the document of FIG. 3D.

Figure 4:
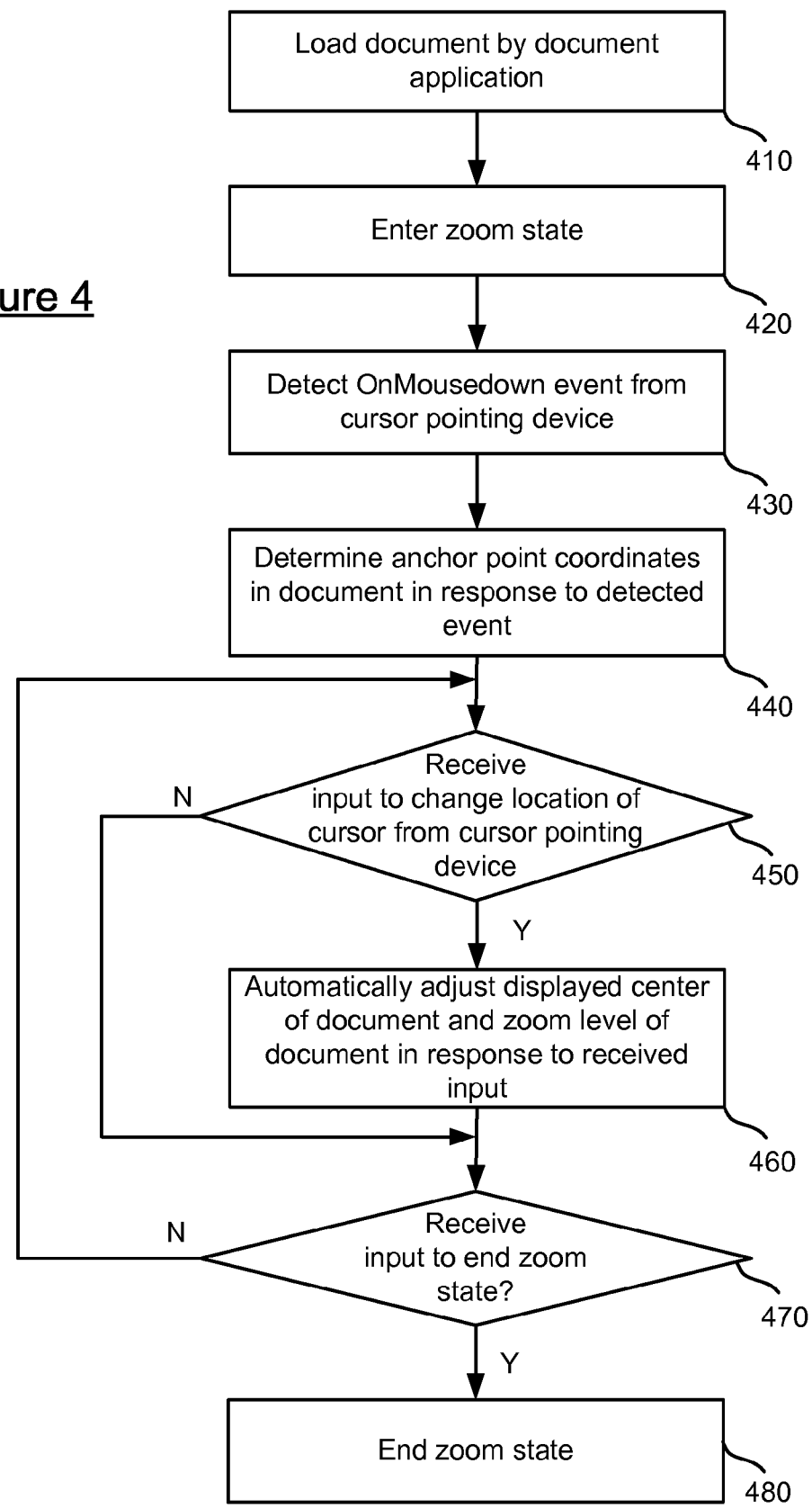
FIG. 4 is a flowchart of an embodiment of a method for providing zoom and scrolling functionality in a document.

FIG. 4 illustrates a flowchart of an embodiment of a method for simultaneously performing zoom and scroll operations in a document. First, document 100 is loaded by document application 110. Next, a zoom state is entered at step 420. In some embodiments, a zoom state is entered in response to receiving user input to enter or begin the zoom state. When entering the zoom state, document viewing application 110 may save default information regarding the current state of the document. The default information may include the default zoom and scroll settings and can be restored after the zoom state has ended. Entering a zoom state is discussed in more detail below with respect to the process of FIG. 5.

An OnMousedown event is detected from input received through a pointing device or other input device at step 430. When the pointing device is a mouse, the OnMousedown event indicates that a button on the mouse device has been depressed and held down. The OnMousedown event may be associated with the left button of a plain and simple mouse device, such as a mouse device which does not have a scroll wheel. In some embodiments, the input received at step 430 is an Onclick input. The Onclick event indicates that a user has clicked (i.e., depressed and released) a button on the mouse.

Anchor point coordinates are determined in document 100 in response to the detected event at step 440. In one embodiment, document application 110 may determine the current coordinates of the zoom cursor in response to detecting an OnMousedown event or on-click event at step 430. Determining the zoom cursor coordinate may include sending a cursor location request to the operating system of computer 140. The zoom cursor coordinates associated with the detected event are then selected as the anchor point.

A determination is made as to whether input is received from a cursor pointing device to change the location of the zoom cursor at step 450. The input may be received as a pointing device "drag" input or some other input that changes the location of a zoom cursor provided in document 100 during zoom mode.

If input to change the position of the zoom cursor is received at step 450, the displayed center of the document and zoom level are automatically adjusted in response to the received input at step 460. The amount of adjustment to the displayed center of the document and zoom level may depend upon the distance between the anchor point and the zoom cursor. For example, the further the zoom cursor is from the anchor point, the greater the change in zoom level and scrolling. In some embodiments, the change in zoom level and scrolling is performed while the cursor position is changing. Thus, the zoom and scrolling changes are performed in response to small changes in zoom cursor position. Automatically adjusting the displayed center of the document and zoom level of the document is discussed in more detail below with respect to FIG. 6. After automatically adjusting the displayed center of the document and zoom level of the document, the method of FIG. 4 continues to step 470. If input is not received at step 450 to change the position of the cursor in document 100, the method of FIG. 4 continues to step 470.

A determination is made as to whether input is received to end a zoom state at step 470. If input is received to end the zoom state, the zoom state ends at step 480. Input that may trigger the end of the zoom state may include detection of an OnMouseup event, selection of a zoom state button in a document application toolbar, or some other input. The OnMouseup event may be associated with the release of the left button of a plain and simple mouse device which does not have a scroll wheel. Ending a zoom state may result in restoring the default state of the document saved at step 420 (and discussed with respect to FIG. 5). For example, document application 110 may return to the default zoom level and default scroll position which the document was displayed at before the zoom state was entered. If input is not received to end the zoom state at step 470, the method of FIG. 4 returns to step 450.

Figure 5:
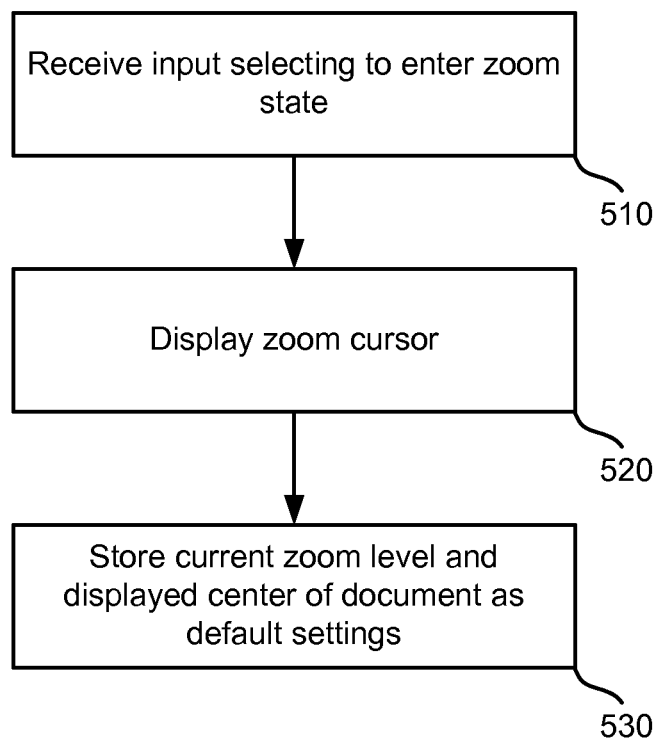
FIG. 5 is a flowchart of an embodiment of a method for triggering a zoom state.

FIG. 5 is a flowchart of an embodiment of a process for entering a zoom state. In one embodiment, the method of FIG. 5 provides more detail for step 420 of FIG. 4. First, input is received indicating that a zoom state should be entered at step 510. The input may be selection of a button provided in a toolbar, a GUI element, dropdown menu element, or some other input received through document application 110. The input to enter the zoom state may be received through keyboard, pointing device, or some other input device. Next, zoom cursor 310 is displayed in the document at step 520. An example of a zoom cursor is provided in FIG. 3A. The zoom cursor may replace a default cursor provided by document application 110 when not in the zoom state. The current zoom level and displayed center of the document is then stored as a default setting at step 530. This default setting may be restored upon triggering the end of the zoom state at step 480 in the method of FIG. 4.

Figure 6:
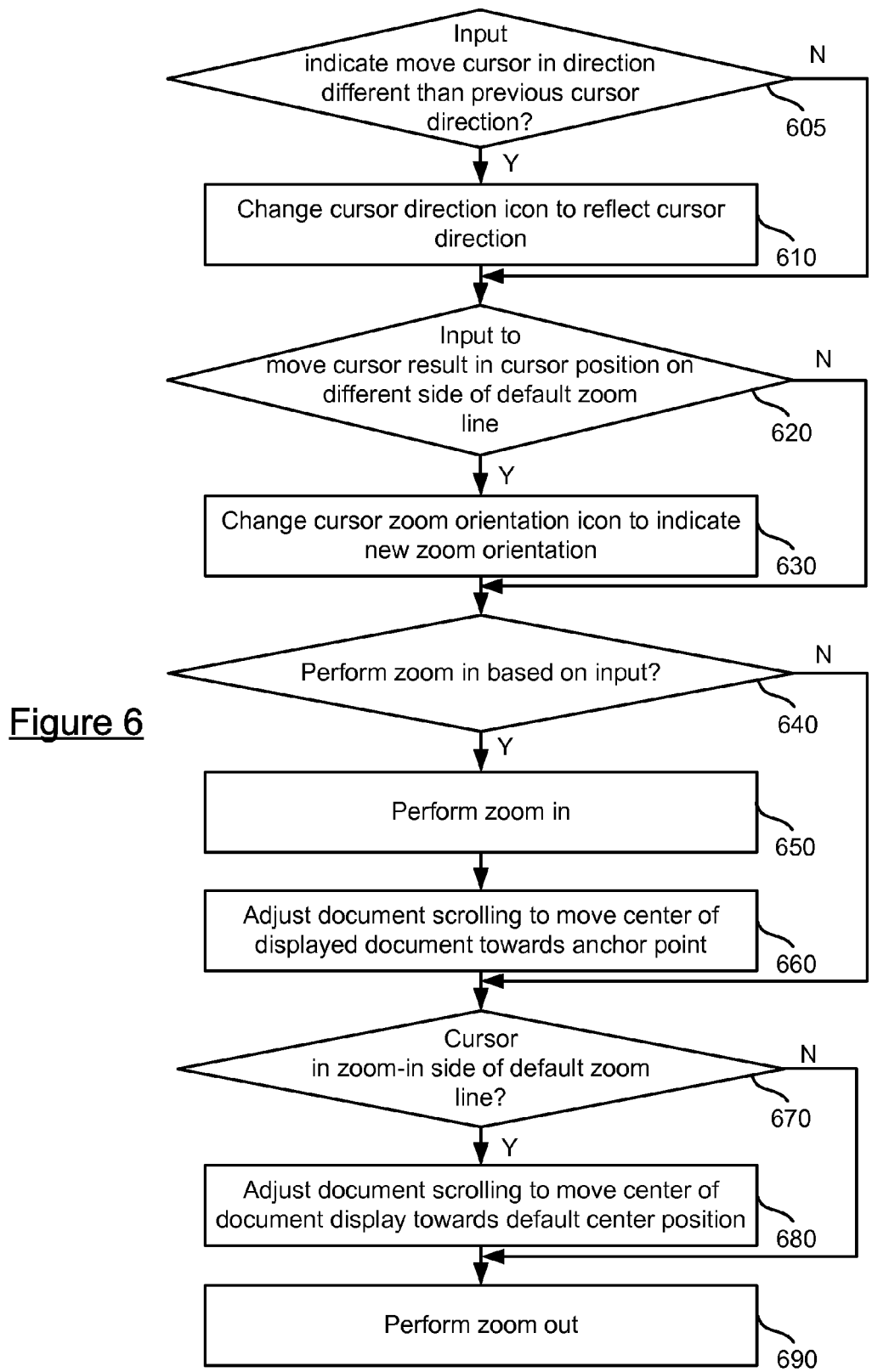
FIG. 6 is a flowchart of an embodiment of a method for automatically adjusting a displayed center of zoom level of a document.

FIG. 6 illustrates a flowchart of an embodiment of a method for automatically adjusting a zoom level and a displayed center of the document. In one embodiment, the method of FIG. 6 provides more detail for step 460 of the method of FIG. 4. First, a determination is made as to whether input received at step 450 of the method of FIG. 4 indicates that the zoom cursor is moved in a direction which differs than the previous cursor direction at step 605. Thus, a determination is made as to whether a user has decided to change a current direction of cursor movement with respect to the previous cursor movement, if any, by the user. If the input received is the first input that changes the position of the cursor while in zoom state, the method continues as if the cursor direction has changed. If the input does not indicate that the cursor is moved in a different direction than the previous direction, the method of FIG. 6 continues to step 620. If the input indicates that the cursor should be moved in a different direction as previously moved, the cursor direction icon is changed to reflect the new cursor direction at step 610. For example, if a cursor was being previously moved to the right and the input received indicates that the cursor should now be moved to the left, the cursor direction icon will change to reflect that the cursor is now being moved to the left. Thus, the cursor will change from the cursor displayed in zoom region 331 to the cursor displayed in zoom region 323. The method of FIG. 6 then continues to step 620.

A determination is made as to whether the input to move the cursor results in the cursor position moving to a different side of default zoom line 340 in the symbolic zoom map of document 100 at step 620. In some embodiments, document application 110 will determine if the coordinates of the zoom cursor indicate that the zoom cursor has switched from a zoom in portion to a zoom out portion of the document, or vice versa. If the input to move the cursor results in the cursor crossing the default zoom line 340, the cursor zoom orientation icon is changed to indicate the new zoom orientation at step 630. For example, the zoom orientation icon can be changed to include a plus sign instead of a minus sign to indicate that the zoom operation is being changed from zooming in to zooming out with respect to anchor point 350. The method of FIG. 6 then continues to step 640. If input to move the cursor does not result in the cursor position crossing the default zoom line, the method of FIG. 6 continues to step 640.

In some embodiments, the cursor zoom orientation icon is changed to indicate the new zoom orientation based on the direction of the zoom cursor. For example, if the zoom cursor is being moved in a zoom out direction, the zoom orientation icon can be changed to include a plus sign. If the zoom cursor is being moved in a zoom in direction, the zoom orientation icon can be changed to include a minus sign.

A determination is made as to whether the input indicates a zoom-in operation should be performed at step 640. Thus, document application 110 determines whether the new position of the cursor is contained in zoom portion 330-334 of the symbolic zoom map of FIG. 3B. This may be determined by comparing coordinates of the zoom cursor location to coordinates of anchor point 350. In some embodiments, the zoom level is determined relative to the original zoom and not the current setting. Thus, if the zoom cursor is positioned some positive pixels to the lower right from the original anchor point, and a pointing device is moving towards the upper left while remaining in the lower right region, I'm more zoomed-in relative to the stored original zoom, but it's zooming out from the currently displayed zoom and showing a minus on the cursor.

Based on the comparison, document application 110 may determine what region in the symbolic zoom map the cursor is positioned in. If the input does not indicate a zoom-in function should be made, the process of FIG. 6 continues to step 670. If the input indicates that a zoom-in function should occur, a zoom-in operation is performed at step 650. The zoom-in level is proportional to the distance the zoom cursor is away from anchor point 350. Thus, if the cursor was moved to a position displayed a few pixels away from anchor point 350 or default zoom line 340, the zoom-in level would be smaller compared to moving the cursor to a location that is forty pixels away from the anchor point or default zoom line.

Next, the document scrolling of the displayed document within document application 110 is adjusted to move the center of the displayed document towards anchor point 350 at step 660. Adjusting the document scrolling helps move the anchor point 350 towards the center of the displayed document as the document is zoomed in on. In some embodiments, the anchor point is moving in document space. Thus, the pointing device is interpreted relative to the screen. As with zooming, the scrolling function is performed with respect to the distance of the zoom cursor from the anchor point. The method of FIG. 6 then continues to step 670.

A determination is made as to whether the zoom cursor is positioned on the zoom in side of the default zoom line at step 670. If the zoom cursor is positioned on the zoom in side of the default zoom line 349 (zoom portions 331-334 of the symbolic zoom map of FIG. 3B), the document scrolling function is adjusted to move the center of the document displayed towards the default center displayed at step 680. Thus, a determination is made that the level of zoom has decreased but is still within a zoom-in portion of the symbolic zoom map. In some embodiments, once a cursor is determined to be in one of zoom out portions 321-324, scrolling is not performed in response to receiving input to move the cursor. After adjusting the document's scrolling at step 680, the document application 110 zooms out from anchor point 350.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. A computer implemented method for displaying a document, comprising:
   loading and displaying a document with a document application;
   generating a zoom map associated with the document, said zoom map defines an anchor point, a default zoom line, one or more zoom in regions, and one or more zoom out regions, the default zoom line separating the one or more zoom-in regions from the one or more zoom-out regions;
   entering a zoom state of the document application upon receiving an input selecting to enter the zoom state of the document application;
   upon entering the zoom state, displaying a zoom cursor for the zoom state having an appearance that is different than a default cursor;
   receiving a first user input identifying a first location within the document while in the zoom state of the document application;
   designating the first location as said anchor point;
   subsequently receiving a second user input identifying a second location within the document while in the zoom state of the document application, said second user input is received by dragging the zoom cursor across the document from the first location to the second location using an input device;
   using said zoom map to determine one or more zoom functions associated with said zoom cursor based on said movement of said zoom cursor from the first location to the second location, said one or more zoom functions associated with said zoom cursor include a zoom direction, a zoom level, and whether a zoom in function or a zoom out function is performed to the document; and
   in response to receiving the second user input, simultaneously performing zooming and scrolling operations to the document, said simultaneously performing zooming and scrolling operations to the document includes automatically adjusting the center of the displayed document with respect to the anchor point based on a relationship between the first and second locations, automatically adjusting the zoom level of the document based on a relationship between the first and second locations, and changing an appearance of the zoom cursor based on said determining by said zoom map with respect to said one or more zoom functions associated with said zoom cursor to provide an indication of a zoom direction from the first location to the second location, a zoom level from the first location to the second location, and whether a zoom in function or a zoom out function is being performed with respect to said anchor point.

2. The computer implemented method of claim 1, wherein:
   the input device is a pointing device;
   the displayed center of the document is automatically adjusted to move towards the anchor point; and
   the zoom level of the document is automatically adjusted to zoom in from the previous zoom level.

3. The computer implemented method of claim 2, wherein the anchor point is associated with a first set of coordinates within the document, said step of automatically adjusting the displayed center includes:
   determining a second set of coordinates associated with the second input;
   determining a distance between the first set of coordinates and the second set of coordinates; and
   adjusting the center of the document towards the anchor point based on the distance.

4. The computer implemented method of claim 2, wherein the anchor point is associated with a first set of coordinates within the document, said step of automatically adjusting the displayed center includes:

determining a second set of coordinates associated with the second input;

determining a number of pixels between the first set of coordinates and the second set of coordinates; and adjusting the magnification level of the displayed portion of the document based on the number of pixels between the first set of coordinates and the second set of coordinates and a direction travelled from the first set of coordinates to the second set of coordinates.

5. The computer implemented method of claim 1, wherein:

the displayed center of the document is automatically adjusted to move away from the anchor point; and the zoom level of the document is automatically adjusted to zoom out from the previous zoom level.

6. The computer implemented method of claim 5, wherein the anchor point is associated with a first set of coordinates within the document, said step of automatically adjusting the displayed center includes:

determining a second set of coordinates associated with the second input;

determining a distance between the first set of coordinates and the second set of coordinates; and adjusting the center of the document away from the anchor point and towards a default point in the document based on the distance.

7. The method of claim 1, wherein the input device is a pointing device.

8. One or more computer storage media, not including a modulated data signal, the one or more computer storage media having processor readable code embodied on said computer storage media, said processor readable code for programming one or more processors to perform a method comprising:

loading and displaying a document with a document application;

generating a zoom map associated with the document, said zoom map defines an anchor point, a default zoom line, one or more zoom in regions, and one or more zoom out regions, the default zoom line separating the one or more zoom-in regions from the one or more zoom-out regions;

entering a zoom state of the document application upon receiving an input selecting to enter the zoom state of the document application;

upon entering the zoom state, displaying a zoom cursor for the zoom state having an appearance that is different than a default cursor;

receiving a first input into the document;

selecting a first set of coordinates in the document based on said first input;

receiving a second input into the document;

selecting a second set of coordinates in the document based on said second input;

calculating a distance between the second set of coordinates and the first set of coordinates;

determining an angle between the second set of coordinates and the first set of coordinates, said determined angle has a value between 0 degrees and 360 degrees;

determining one or more zoom functions associated with said zoom cursor according to said zoom map associated with said document, said zoom map determines a zoom direction, a zoom level, and whether a zoom in function or a zoom out function is performed to the document based on said calculated distance and determined angle;

in response to receiving the second input, automatically performing a scrolling operation and a zoom operation based on the calculated distance and determined angle, wherein the scrolling operation and the zoom operation to the document are performed simultaneously; and providing one or more indications on the zoom cursor to indicate a directionality of the scrolling operation and the zoom operation, a zoom level of the zoom operation, and whether a zoom in or zoom out function is being performed to the document.

9. The one or more computer storage media of claim 8, wherein the first input is received from a pointing device.

10. The one or more computer storage media of claim 8, wherein the first input is an OnMouseDown event.

11. The one or more computer storage media of claim 8, wherein the first input selects an anchor point in a displayed page of the document, the first set of coordinates set as the anchor point in the displayed page.

12. The one or more computer storage media of claim 8, wherein the second input includes an OnMouseMove event.

13. The one or more computer storage media of claim 8, the second input associated with a second set of coordinates.

14. A computer implemented method for displaying a document, comprising:

providing a document by a document application;

generating a zoom map associated with the document, said zoom map defines an anchor point, a default zoom line, one or more zoom in regions, and one or more zoom out regions, the default zoom line separating the one or more zoom-in regions from the one or more zoom-out regions;

receiving a first input from the document application with respect to the document from an input device;

determining an anchor point in the document based on the first input;

receiving a second input from the document application with respect to the document by dragging a zoom cursor displayed within the document in a first direction away from the anchor point;

in response to said movement of said zoom cursor in said first direction, using said zoom map to determine one or more functions of said zoom cursor with respect to zoom directions and zoom levels based on a distance and an angle of the zoom cursor from the anchor point, said angle of said zoom cursor from said anchor point is between 0 degrees and 360 degrees, said zoom map includes said anchor point and a default zoom line separating zoom in regions from zoom out regions;

in response to receiving the second input, simultaneously performing zooming and scrolling operations to the document, said simultaneously performing zooming and scrolling operations to the document includes automatically and simultaneously adjusting a magnification level and a displayed center of the document based on the distance and the angle of the zoom cursor from the anchor point; and automatically changing an appearance of the zoom cursor in response to using said zoom map to determine said one or more functions of said zoom cursor to provide a first visual indication that the cursor is being moved in the first direction and a second visual indication of the magnification level.

15. The method of claim 14, wherein said first input includes input to move the cursor away from an anchor point in a magnification region of the document, wherein said step of changing an appearance includes:

displaying an indicator associated with the cursor that the magnification of the document is increased.

16. The method of claim 14, wherein said first input includes input to move the cursor away from an anchor point in a demagnification region of the document, wherein said step of changing an appearance includes:
  displaying an indicator associated with the cursor that the demagnification of the document is increased.

17. The method of claim 14, wherein said step of changing an appearance includes:
  detecting that the cursor is moved in a new direction that differs from the immediately preceding direction; and
  changing the appearance of the indicator based on the new direction.

18. The method of claim 14, wherein the zoom cursor includes a center portion and a plurality of outer portions arranged around the center portion, wherein each of the outer portions is a directional indicator pointing away from the center portion, further comprising:
  during the automatic adjustment of the center and the magnification level, displaying only the center portion and one of the outer portions of the zoom cursor, said one of the outer portions providing a directional indicator pointing in the first direction.

19. The method of claim 14, wherein the zoom cursor includes a center portion and a plurality of outer portions arranged around the center portion, wherein the center portion displays a first symbol when the magnification level is increased and a second symbol when the magnification level is decreased.

* * * * *